United States Patent
Wyatt et al.

(10) Patent No.: US 9,384,713 B1
(45) Date of Patent: Jul. 5, 2016

(54) SYSTEM AND METHOD FOR MASKING TRANSISTIONS BETWEEN GRAPHICS PROCESSING UNITS IN A HYBRID GRAPHICS SYSTEM

(75) Inventors: David Wyatt, San Jose, CA (US); Mark A. Overby, Bothell, WA (US); Hon Fei Chong, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2079 days.

(21) Appl. No.: 12/510,171

(22) Filed: Jul. 27, 2009

(51) Int. Cl.
G06F 15/16 (2006.01)
G09G 5/36 (2006.01)
G06F 3/14 (2006.01)

(52) U.S. Cl.
CPC .............. *G09G 5/363* (2013.01); *G06F 3/1438* (2013.01); *G06F 2209/509* (2013.01)

(58) Field of Classification Search
CPC . G06F 2209/509; G06F 3/1438; G09G 5/363; G09G 2360/06; G09G 2352/00; G06T 2210/52
USPC .................................................. 345/502–505
See application file for complete search history.

(56) References Cited

U.S. PATENT DOCUMENTS

| | | | |
|---|---|---|---|
| 7,698,579 B2 * | 4/2010 | Hendry et al. ................ | 713/300 |
| 2007/0195099 A1 * | 8/2007 | Diard et al. ................... | 345/501 |
| 2009/0079746 A1 * | 3/2009 | Howard et al. ............... | 345/502 |

* cited by examiner

*Primary Examiner* — Hau Nguyen
(74) *Attorney, Agent, or Firm* — Artegis Law Group, LLP

(57) ABSTRACT

Typical hybrid graphics systems operate in either a "high-performance mode" or in an "energy saver mode." While operating in the high-performance mode, a discrete graphics processing unit (dGPU) performs high-performance graphics processing operations and also receives and satisfies access requests targeting a configuration space within the dGPU. While operating in the energy saver mode, an integrated graphics processing unit (iGPU) performs graphics processing operations and the dGPU is powered down. In this scenario, a system management unit (SMU) intercepts and satisfies access requests targeting the dGPU. Since access requests targeting the dGPU are satisfied while the dGPU is powered down, the dGPU continues to be enumerated in the system using the same system resources as originally granted, and can therefore be switched to for implementing high-performance mode more quickly than if it was removed, and required a complete plug-and-play re-enumeration and reallocation of system resources.

21 Claims, 6 Drawing Sheets

SYSTEM AND METHOD FOR MASKING TRANSISTIONS BETWEEN GRAPHICS PROCESSING UNITS IN A HYBRID GRAPHICS SYSTEM

BACKGROUND OF THE INVENTION

1. Field of the Invention

The present invention relates generally to the field of graphics software and, more specifically, to a system and method for masking transitions between graphics processing units in a hybrid graphics system.

2. Description of the Related Art

A modern computer system may include a graphics processing unit (GPU) that performs graphics processing operations in conjunction with a central processing unit (CPU) also included in the computer system. For example, the GPU may augment the processing capabilities of the CPU in order to generate digital images that can be output to a display screen associated with the computer system. Some computer systems include two or more GPUs that operate in concert to perform graphics processing operations. A computer system that includes two or more GPUs is often referred to as a "hybrid graphics system."

One example of hybrid graphics system includes an integrated GPU (iGPU) that is integrated into a motherboard included in the hybrid graphics system. The iGPU is configured to perform basic graphics processing operations. In addition to the iGPU, the hybrid graphics system also includes a discrete GPU (dGPU) located on an add-in card coupled to the hybrid graphics system. The dGPU is configured to perform high-performance graphics processing operations and typically consumes more power than the iGPU.

When high-performance graphics processing operations are not being performed by the dGPU, the hybrid driver causes the hybrid graphics system to operate in a "nominal mode" and graphics processing operations are performed on the iGPU. When high-performance graphics processing operations are being performed by the dGPU, a hybrid driver causes the hybrid graphics system to operate in a "high-performance mode," where graphics processing operations are performed on the dGPU. While operating in the nominal mode, the hybrid driver causes the dGPU to be powered off, thereby conserving power.

The hybrid driver may cause the hybrid graphics system to transition from the high-performance mode to the nominal mode or, alternatively, from the nominal mode to the high-performance mode. When the hybrid driver causes the hybrid graphics system to transition from the nominal mode to the high-performance mode, the hybrid driver powers up the dGPU, causes the dGPU to be re-enumerated, reloads a driver associated with the dGPU, and re-initializes the driver, among other things. High-performance graphics processing operations may then be performed on the dGPU.

However, this approach transitioning between graphics processing modes suffers from certain drawbacks. First, the process of transitioning from the nominal mode to the high-performance mode may take up to fifteen seconds or longer to complete, thus forcing a user of the hybrid graphics system to wait during the transition period from the nominal mode to the high-performance mode. During this transition period, the hybrid driver powers up the dGPU, enumerates the dGPU to one or more software applications, reloads a driver into the dGPU, and reinitializes the driver. Each of these various steps prolongs the transition period from the nominal mode to the high-performance mode. Second, during this transition period, the dGPU cannot generate images for display, and so a display screen associated with the hybrid graphics system may display a blank screen, thereby disrupting the visual experience of the user of the hybrid graphics system.

Accordingly, what is needed in the art is a more effective way to transition between operating states in a hybrid graphics system.

SUMMARY OF THE INVENTION

Embodiments of the invention set forth a computer-implemented method for masking transitions between graphics processing modes in a computer system that includes a graphics processing unit (GPU). The method includes the steps of determining that a hybrid driver has initiated a transition for the computer system from operating in a first graphics processing mode to operating in a second graphics processing mode, creating a virtual configuration space within the computer system by copying a configuration space included within the GPU to a memory unit included within the computer system, receiving, from a software application, an access request that targets the GPU, satisfying the access request by updating the virtual configuration space based on the access request, and transmitting a confirmation to the software application indicating that the access request has been satisfied.

Advantageously, the GPU does not need to be re-enumerated when the GPU is powered on, thereby expediting the transition of the computer system from the second graphics processing mode to the first graphics processing mode. Additionally, a driver associated with the GPU does not need to be reloaded into the GPU or reinitialized when the GPU is powered on, further expediting this transition. Further, since the computer system is capable of transitioning quickly from the second graphics processing mode to the first graphics processing mode, the amount of time that the computer system causes a blank screen to be displayed to a user is minimized.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. The appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring embodiments of the invention.

Figure 1:
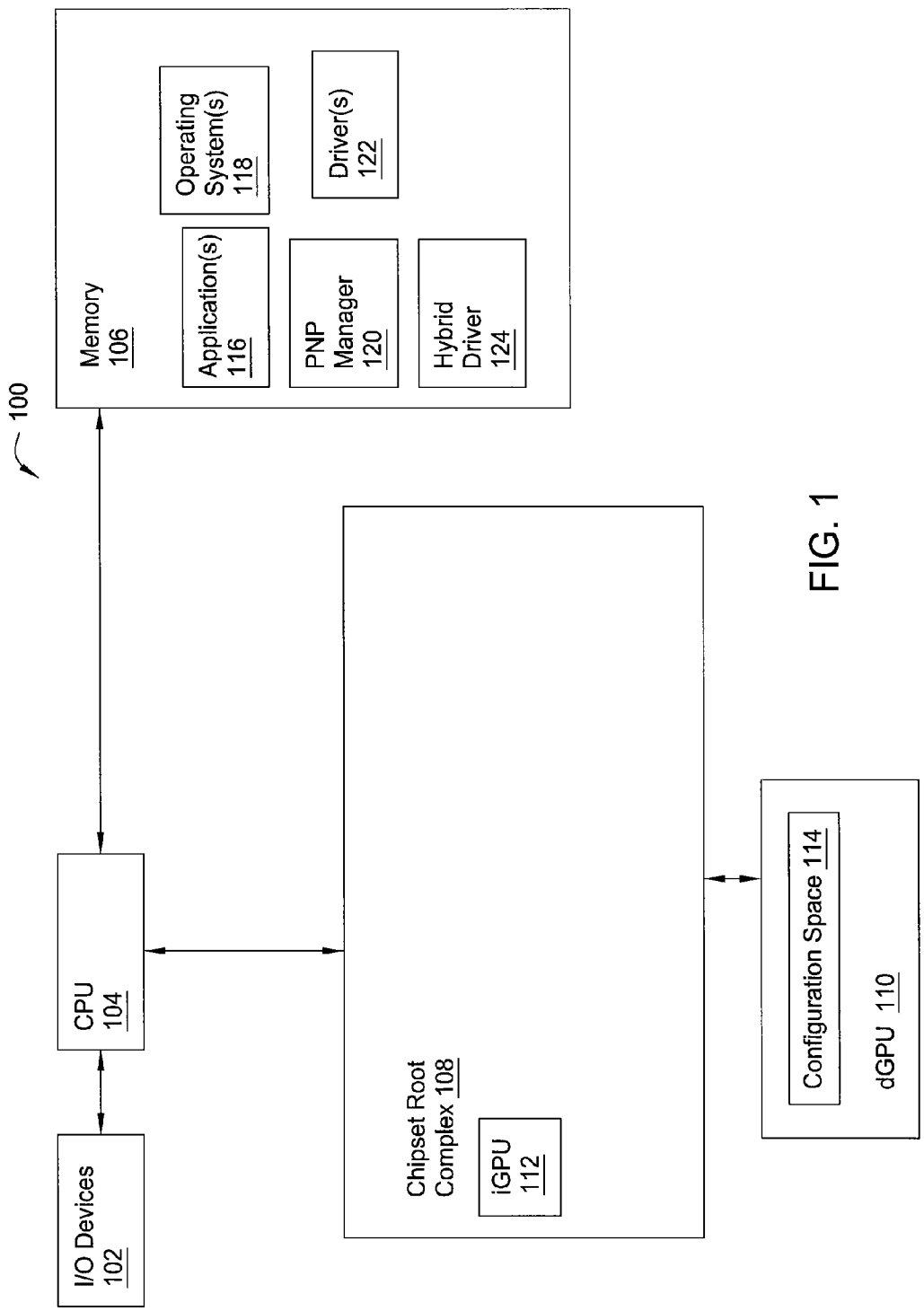
FIG. 1 is a block diagram of a system configured to implement one or more aspects of the invention.

FIG. 1 is a block diagram of a system configured to implement one or more aspects of the invention. As shown, the system 100 includes one or more input/output (I/O) devices 102, a central processing unit (CPU) 104, a memory 106, a chipset root complex 108, and a discrete graphics processing unit (dGPU) 110. The I/O devices 102, the CPU 104, the memory 106, the chipset root complex 108, and the dGPU 110 may be coupled to one another via a system bus (not shown). In one embodiment, the system bus is a peripheral component interconnect express (PCIe) bus.

The I/O devices 102 are coupled to the CPU 104 and may include a mouse, a keyboard, a joystick, a video game controller, a touchpad, a microphone, or a video camera, among other types of input devices. The I/O devices 102 may also include a display screen, a speaker, or a projector, among other types of output devices. The I/O devices 102 may further include various ports that allow data to be transferred to and/or from the system 100, including a universal serial bus (USB) port, a serial port, a firewire port, a telephone jack, or an Ethernet port, among others. In one embodiment, the I/O devices 102 provide access to a network, such as the Internet. In another embodiment, the I/O devices 102 are coupled to the memory 106 via the CPU 104 and allow data to be transferred to and/or from the memory 106 via the CPU 104.

The CPU 104 may be any type of processor, including an integrated circuit (IC), an application-specific integrated circuit (ASIC), a field-programmable gate array (FPGA), among others. In one embodiment, the CPU 104 is a graphics processing unit (GPU). The CPU 104 is configured to execute various software programs stored in the memory 106, as described in greater detail below. The CPU 104 is coupled to the chipset root complex 108 and configured to transmit data to and receive data from the chipset root complex 108.

The chipset root complex 108 is a controller that manages transactions between various components of the system 100. The chipset root complex 108 is coupled to the dGPU 110 and to the CPU 104. In embodiments where the various components of the system 100 are coupled together via a PCIe bus, the chipset root complex 108 is configured to manage data transactions between the various components across the PCIe bus. The chipset root complex 108 includes an integrated GPU (iGPU) 112 that is included in the chipset root complex 108. The iGPU 112 is configured to execute graphics processing operations. In some embodiments, the CPU 104 offloads graphics processing operations onto the iGPU 112 in order to expedite these graphics processing operations. In other embodiments, the CPU 102 may offload other types of processing operations onto the iGPU 112 in order to expedite these other types of processing operations.

Similar to the iGPU 112, the dGPU 110 is configured to execute graphics processing operations. In some embodiments, the CPU 102 may offload other types of processing operations, other than graphics processing operations, onto the dGPU 110 in order to expedite these other types of processing operations. In further embodiments, the dGPU 110 may be configured to perform high-performance graphics processing operations that cannot be efficiently executed by the iGPU 114. For example, the dGPU 110 could perform graphics processing operations associated with a graphics-intensive video game that would not be efficiently performed by the iGPU 112.

The dGPU 110 includes a configuration space 114. The configuration space 114 includes one or more configuration registers that may be accessed by the software applications included in the memory 106. As further described herein, the software applications may transmit access requests that target the dGPU 110. In order to satisfy these access requests, the dGPU 110 updates the configuration space 114. In doing so, the dGPU 110 modifies values stored in specific configuration registers included in the configuration space 114 indicated in the access request. The dGPU 110 updates these specific configuration registers to reflect values indicated in the access request. The dGPU 110 then transmits a confirmation to the software program from which the access request was received.

The memory 106 may be any technically feasible type of memory, including a hard disk, a flash drive, a random access memory (RAM) unit, or a read-only memory (ROM) unit, among others. The software programs included in the memory 106, as referred to above, include one or more applications 116, one or more operating systems 118, a plug-n-play (PNP) manager 120, one or more drivers 122, and a hybrid driver 124.

The one or more applications 116 may include various types of software applications, including video game applications, word processing applications, spreadsheet applications, or internet browsing applications, among others. The one or more operating systems 118 may include one or more well-known operating systems, including a Windows™ operating system, a Linux operating system, or a Mac OS X™ operating system, among others. In one embodiment, the operating systems 118 include more than one operating system, and the applications 116 include a hypervisor configured to manage the operation of those operating systems.

The one or more drivers 122 are executed by the CPU 104, the iGPU 112, or the dGPU 110 to translate program instructions into different types of machine code. For example, the CPU 104 could execute the driver 122 associated with the dGPU 110 to translate program instructions into machine code native to the dGPU 110. When the system 100 is first powered on, the driver 122 associated with the iGPU 112 is loaded into the iGPU 112 and initialized. As with the iGPU 112, when the hybrid graphics system 100 is first powered on, the driver 122 associated with the dGPU 110 is loaded into the dGPU 110 and initialized.

The PNP manager 120 is executed by the CPU 104 to manage the configuration of one or more devices coupled to the system 100, such as, for example, the dGPU 110. When executed by the CPU 104, the PNP manager 120 transmits access requests to the devices coupled to the system 100, including the dGPU 110, via the chipset root complex 108. The access requests may include memory-mapped input/output (MMIO) access requests and/or configuration space access requests.

The hybrid driver 124 is a software program that, when executed by the CPU 104, causes the system 100 to operate in different graphics processing modes, including a "high-performance mode" and a "nominal mode." In one embodiment, the hybrid driver 124 causes the system 100 to operate in the high-performance mode when high-performance graphics processing operations are required to be performed by the system 100. For example, the hybrid driver 124 causes the system 100 to operate in the high-performance mode when the system 100 executes a complex physical simulation involving graphics-intensive operations. When the system 100 operates in the high-performance mode, the hybrid driver 124 causes the system 100 to perform graphics processing operations with the dGPU 110.

Conversely, the hybrid driver 124 causes the system 100 to operate in the nominal mode when high-performance graphics processing operations are not required to be performed by the system 100. For example, the hybrid driver 124 causes the system 100 to operate in the nominal mode when the system 100 generates images for a simple web page. When the system 100 operates in the nominal mode, the hybrid driver 124 causes the system 100 to perform graphics processing operations with the iGPU 112. When the system 100 operates in the nominal mode, hybrid driver 124 causes the dGPU 110 to be powered down.

The hybrid driver 124 is further configured to cause the system 100 to transition from the nominal mode to the high-performance mode, and to transition from the high-performance mode to the nominal mode. The hybrid driver 124 causes the system 100 to transition between different graphics processing modes based on the complexity of graphics processing operations required to be performed by the system 100, based on an amount of battery power remaining in a battery associated with the system 100, or based on user input, among other things.

For example, when the CPU 104 executes a graphics-intensive video game that involves high performance graphics processing operations, the hybrid driver 124 could initiate a transition of the system 100 from the nominal mode to the high-performance mode in order to perform high-performance graphics processing operations on the dGPU 110. In another example, if the system 100 is a laptop computer system that includes a battery, and the amount of battery power remaining in the battery decreases below a particular level, then the hybrid driver 124 could initiate a transition of the system 100 from the high-performance mode to the nominal mode in order to perform graphics processing operations on the iGPU 112, thereby conserving battery power.

When the hybrid driver 124 causes the system 100 to transition from nominal mode to high-performance mode, the hybrid driver 124 causes the dGPU 110 to power up, migrates any threads executing on the iGPU 112 to the dGPU 110, and reroutes graphics processing operations to the dGPU 110. When the hybrid driver 124 causes the system 100 to transition from the high-performance mode to the nominal mode, the hybrid driver 124 migrates any threads executing on the dGPU 110 to the iGPU 112, causes the dGPU 110 to power down, and reroutes graphics processing operations to the iGPU 112.

When the system 100 operates in the nominal mode, although the dGPU 110 is powered down, the dGPU 110 remains enumerated and recognized by the PNP manager 120. However, when the PNP manager 120 transmits one or more access requests to the dGPU 110, as described above, the dGPU 110 cannot satisfy these access requests since the dGPU 110 is powered down. As described in greater detail below in FIG. 2, in one embodiment a system management unit (SMU) included in the chipset root complex 108 is configured to intercept the access requests transmitted by the PNP manager 120 on behalf of the dGPU 110 and to satisfy the access requests. In other embodiments such a management unit capable of receiving and satisfying accessing requests may be located in the CPU, GPU or other places along the route.

Figure 2:
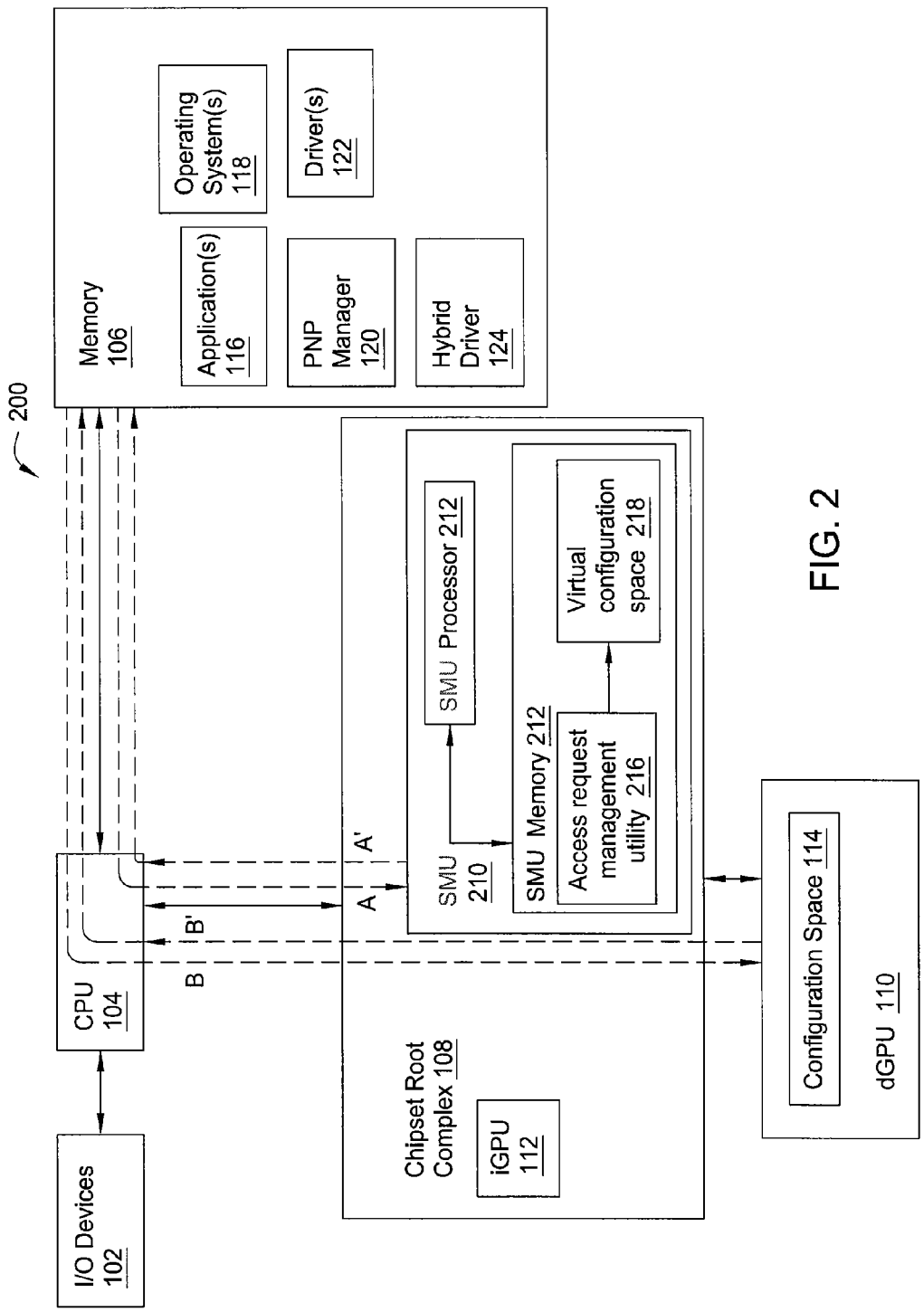
FIG. 2 is a block diagram that illustrates a hybrid graphics system configured to mask the powering up of a discrete graphics processing unit (dGPU) using a system management unit (SMU), according to one embodiment of the invention.

FIG. 2 is a block diagram that illustrates a hybrid graphics system 200 configured to mask the powering up of a discrete graphics processing unit (dGPU) using a system management unit (SMU) 210, according to one embodiment of the invention. As shown, the hybrid graphics system 200 includes substantially the same components as the system 100 illustrated in FIG. 1. In one embodiment, the hybrid graphics system 200 operates in similar fashion as the system 100. In this embodiment, the hybrid graphics system 200 performs graphics processing operations on either the iGPU 110 or the dGPU 112 based on the current graphics processing mode of the hybrid graphics system 200.

In another embodiment, the hybrid graphics system 200 may include only one GPU, such as the dGPU 112, and optionally perform graphics processing operations on the one GPU based on the current graphics processing mode of the hybrid graphics system 200. For example, the hybrid graphics system 200 could perform graphics processing operations on the dGPU 110 when operating in a first graphics processing mode, and perform graphics processing operations on the CPU 104 when operating in a second graphics processing mode.

In addition to including substantially the same components as the system 100, the hybrid graphics system 200 also includes a SMU 210 within the chipset root complex 108. The SMU 210 is a microcontroller configured to manage the power consumption of the hybrid graphics system 200. The SMU 210 includes a SMU processor 212 and a SMU memory 214. The SMU processor 212 may be any technically feasible type of processor configured to execute program instructions, such as a CPU, an IC, an ASIC, or an FPGA. The SMU processor 212 is coupled to the SMU memory 214 and is configured to execute one or more software applications stored in the SMU memory 214. The SMU memory 214 may be any type of memory unit, including a flash memory unit, a RAM unit, or a ROM unit, among others. The SMU memory 214 includes an access request management application 216 and a virtual configuration space 218.

The access request management application 216 is a software application that, when executed by the SMU processor 212, satisfies access requests on behalf of the dGPU 110 when the dGPU 110 is powered down (e.g., when the hybrid graphics system 200 operates in the nominal mode).

When the hybrid driver 124 causes the hybrid graphics system 200 to transition from the high-performance mode to the nominal mode, the SMU processor 212 executes the access request management application 216. When executed by the SMU processor 212, the access request management application 216 copies the configuration space 114 from the dGPU 110 to the virtual configuration space 218. In doing so, the access request management application 216 copies the value of each configuration register included in the configuration space 114 to a corresponding virtual configuration register included in the virtual configuration space 218. In one embodiment, the access request management application 216 generates the virtual configuration space 218 within the memory 106 instead of generating the virtual configuration space 218 within the SMU memory 214.

The access request management application 216 then satisfies access requests transmitted from the PNP manager 120 that target the dGPU 110 by updating the virtual configuration space 218 based on the access requests. For example, when executed by the CPU 104, the PNP manager 120 transmits an access request that targets the dGPU 110 along path A. The access request management application 216 receives the access request and then determines whether the access request targets the dGPU 110.

When the access request targets the dGPU 110, the access request management application 216 satisfies the access request by updating the virtual configuration space 218 based on the access request. More specifically, the access request management application 216 modifies values stored in specific virtual configuration registers indicated in the access request. The access request management application 216 updates these specific virtual configuration registers to reflect values indicated in the access request. When the access request does not target the dGPU 110, the access request management application 216 routes the access request to the device targeted by the access request.

The access request management application 216 then transmits a confirmation to the PNP manager 120 along path A' indicating that the access request has been satisfied. The access request management application 216 is configured to repeatedly satisfy access requests transmitted from the PNP manager 120 that target the dGPU 110 while the hybrid graphics system 200 operates in the nominal mode. In one embodiment, the access request management application 216 also satisfies access requests transmitted by the applications 116 and/or the O/S 118 that target the dGPU 110.

As previously described, the hybrid driver 124 may cause the hybrid graphics system 200 to transition from the nominal mode to the high-performance mode in order to perform high-performance graphics processing operations with the dGPU 110. When the hybrid driver 124 causes the hybrid graphics system 200 to transition from the nominal mode to the high-performance mode, the hybrid driver 124 causes the dGPU 110 to power up, migrates any threads executing on the iGPU 112 to the dGPU 110, and reroutes graphics processing operations to the dGPU 110, as also described. The access request management application 216 then copies the virtual configuration space 218 to the configuration space 114. In doing so, the access request management application 216 copies the value of each virtual register included in the virtual configuration space 218 to a corresponding configuration register included in the configuration space 114.

The dGPU 110 may then receive and satisfy the access requests transmitted by the PNP manager 120 or, in some embodiments, by the applications 116 and/or the O/S 118. When the hybrid graphics system 200 operates in the high-performance mode, the PNP manager transmits access requests to the dGPU 110 along path B. The SMU 210 receives the access requests and routes the access requests to the dGPU 110. The dGPU 110 then satisfies the access requests by updating the configuration space 114. The dGPU 110 then transmits a confirmation to the PNP manager 120 along path B'.

When the access request management application 216 is implemented within the hybrid graphics system 200, the PNP manager 120 may continue to transmit access requests that target the dGPU 110 when the dGPU 110 is powered down (e.g., when the hybrid graphics system 200 operates in the nominal mode). The dGPU 110 remains enumerated to the PNP manager 120 when the dGPU 110 is powered down. Further, the driver 122 associated with the dGPU 110 remains loaded on the dGPU 110 when the dGPU 110 is powered down. When the hybrid driver 124 causes the hybrid graphics system 200 to transition from the nominal mode to the high-performance mode, the dGPU 110 is not re-enumerated to the PNP manager 120 and the driver 120 is not reloaded into the dGPU 110 or reinitialized. Thus, the dGPU 110 does not need to be re-added to the hybrid graphics system 200. Accordingly, by implementing the access request management application 216, the transition of the hybrid graphics system 100 from the nominal mode to the high-performance mode is expedited and, therefore, masked from a user of the hybrid graphics system 200.

In contrast to prior art approaches that require the steps of re-enumerating the dGPU to the PNP manager, reloading and reinitializing the driver associated with the dGPU, and re-adding the dGPU to the hybrid graphics system when powering up the dGPU, the techniques described herein avoid such time-consuming steps.

Although the foregoing description is directed towards the functionality of the access request management application 216, other embodiments of the invention contemplate alternative approaches to masking the powering up of the dGPU 110, as described in greater detail below in FIGS. 3-4.

Figure 3:
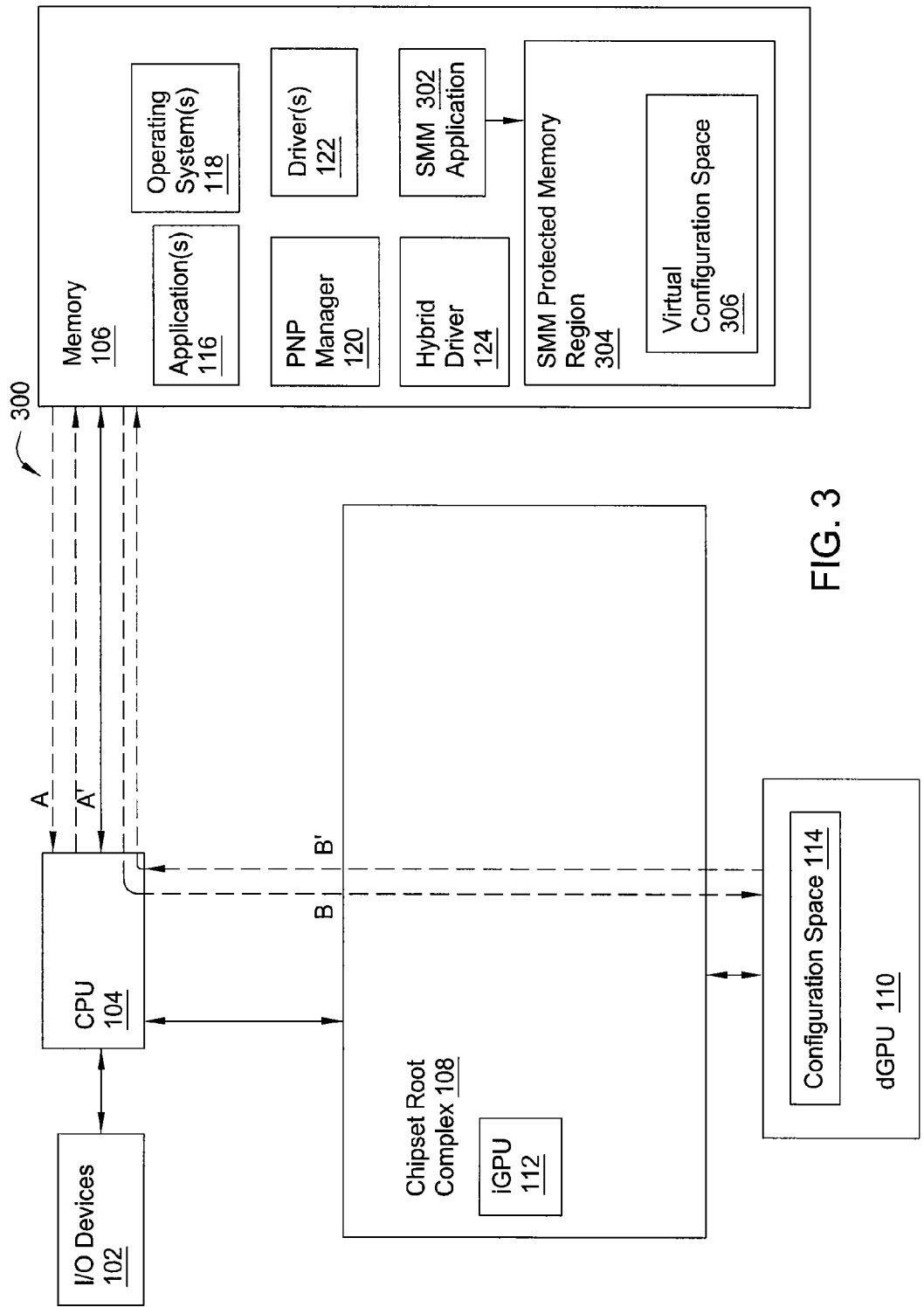
FIG. 3 is a block diagram that illustrates a hybrid graphics system configured to mask the powering up of a dGPU using a system management mode (SMM) application, according to one embodiment of the invention.

FIG. 3 is a block diagram that illustrates a hybrid graphics system 300 configured to mask the powering up of a dGPU 110 using a system management mode (SMM) application 302, according to one embodiment of the invention. Similar to the system 100, hybrid graphics system 300 is configured to operate in the nominal mode or in the high-performance mode. Additionally, the hybrid driver 124 is configured to cause the hybrid graphics system 300 to transition between these two graphics processing modes.

As shown, the hybrid graphics system 300 includes some of the same components included in the system 100 described above in FIG. 1. In addition, the hybrid graphics system 300 also includes a system management mode (SMM) application 302 and an SMM protected memory region 304 within the memory 106. The SMM protected memory region 304 includes a virtual configuration space 306.

The SMM application 302 is a software application that, when executed by the CPU 104, satisfies access requests on behalf of the dGPU 110 when the dGPU 110 is powered down (e.g., when the hybrid graphics system 300 operates in the nominal mode).

When the hybrid driver 124 causes the system 100 to transition from the high-performance mode to the nominal mode, the CPU 104 executes the SMM application 302. When executed by the CPU 104, the SMM application 302 copies the configuration space 114 from the dGPU 110 to the virtual configuration space 304. In doing so, the SMM application 302 copies the value of each configuration register included in the configuration space 114 to a corresponding virtual configuration register included in the virtual configuration space 304.

The SMM application 302 then satisfies access requests transmitted from the PNP manager 120 that target the dGPU 110 by updating the virtual configuration space 304 based on the access requests. When executed by the CPU 104, the PNP manager 120 transmits an access request that targets the dGPU 110 along path A. However, the CPU 104 intercepts this access request, as indicated by path A. In response to the PNP manager 120 transmitting an access request that targets the dGPU 110, the CPU 104 executes the SMM application 302.

The SMM application 302 then satisfies the access request by updating the virtual configuration space 304. The SMM application 302 satisfies the access request by updating the virtual configuration space 304 based on the access request. More specifically, the SMM application 302 modifies values stored in specific virtual configuration registers indicated in the access request. The SMM application 302 updates these specific virtual configuration registers to reflect values indicated in the access request.

The SMM application 302 transmits a confirmation to the PNP manager 120 along path A' indicating that the access request has been satisfied. The SMM application 302 is configured to repeatedly satisfy access requests transmitted from the PNP manager 120 that target the dGPU 110 while the hybrid graphics system 300 operates in the nominal mode. In one embodiment, the SMM application 302 also satisfies access requests transmitted by the applications 116 and/or the O/S 118 that target the dGPU 110. When the access request does not target the dGPU 110, the CPU 104 routes the access request to the device targeted by the access request.

As with the system 100, the hybrid driver 124 may cause the hybrid graphics system 300 to transition from the nominal mode into the high-performance mode in order to perform high-performance graphics processing operations with the dGPU 110. When the hybrid driver 124 causes the hybrid graphics system 300 to transition from nominal mode to high-performance mode, the hybrid driver 124 causes the dGPU 110 to power up, migrates any threads executing on the iGPU 112 to the dGPU 110, and reroutes graphics processing operations to the dGPU 110, as also previously described. The SMM application 302 then copies the virtual configuration space 304 to the configuration space 114. In doing so, the SMM application 302 copies the value of each virtual register included in the virtual configuration space 304 to a corresponding configuration register included in the configuration space 114.

The dGPU 110 may then receive and satisfy access requests transmitted by the PNP manager 120 or, in some embodiments, by the applications 116 and/or the O/S 118. When the hybrid graphics system 300 operates in the high-performance mode, the PNP manager 120 transmits access requests to the dGPU 110 along path B. The dGPU 110 then satisfies these access requests, as described, and transmits a confirmation to the PNP manager 120 along path B'.

As with the access request management application 216 described in FIG. 2, the SMM application 302 allows the PNP manager 120 to continue to transmit access requests that target the dGPU 110 when the dGPU 110 is powered down (e.g., when the system 100 operates in the nominal mode). The dGPU 110 remains enumerated to the PNP manager 120 when the dGPU 110 is powered down. Further, the driver 122 associated with the dGPU 110 remains loaded on the dGPU 110. When the hybrid driver 124 causes the hybrid graphics system 300 to transition from the nominal mode to the high-performance mode, the dGPU 110 is not re-enumerated to the PNP manager 120, and the driver is not reloaded into the dGPU 110 or reinitialized. Thus, the dGPU 110 does not need to be re-added to the hybrid graphics system 300. Accordingly, by implementing the SMM application 302, the transition from the nominal mode to the high-performance mode is expedited and, therefore, masked from a user of the hybrid graphics system 300.

In contrast to prior art approaches that require the steps of re-enumerating the dGPU to the PNP manager, reloading and reinitializing the driver associated with the dGPU, and re-adding the dGPU to the hybrid graphics system when powering up the dGPU, the techniques described herein avoid such time-consuming steps.

In addition to the access request management application 216 described in FIG. 2 and the SMM application 302 described in FIG. 3, further embodiments of the invention contemplate alternative approaches to masking the powering up of the dGPU 110, as described in greater detail below in FIG. 4.

Figure 4:
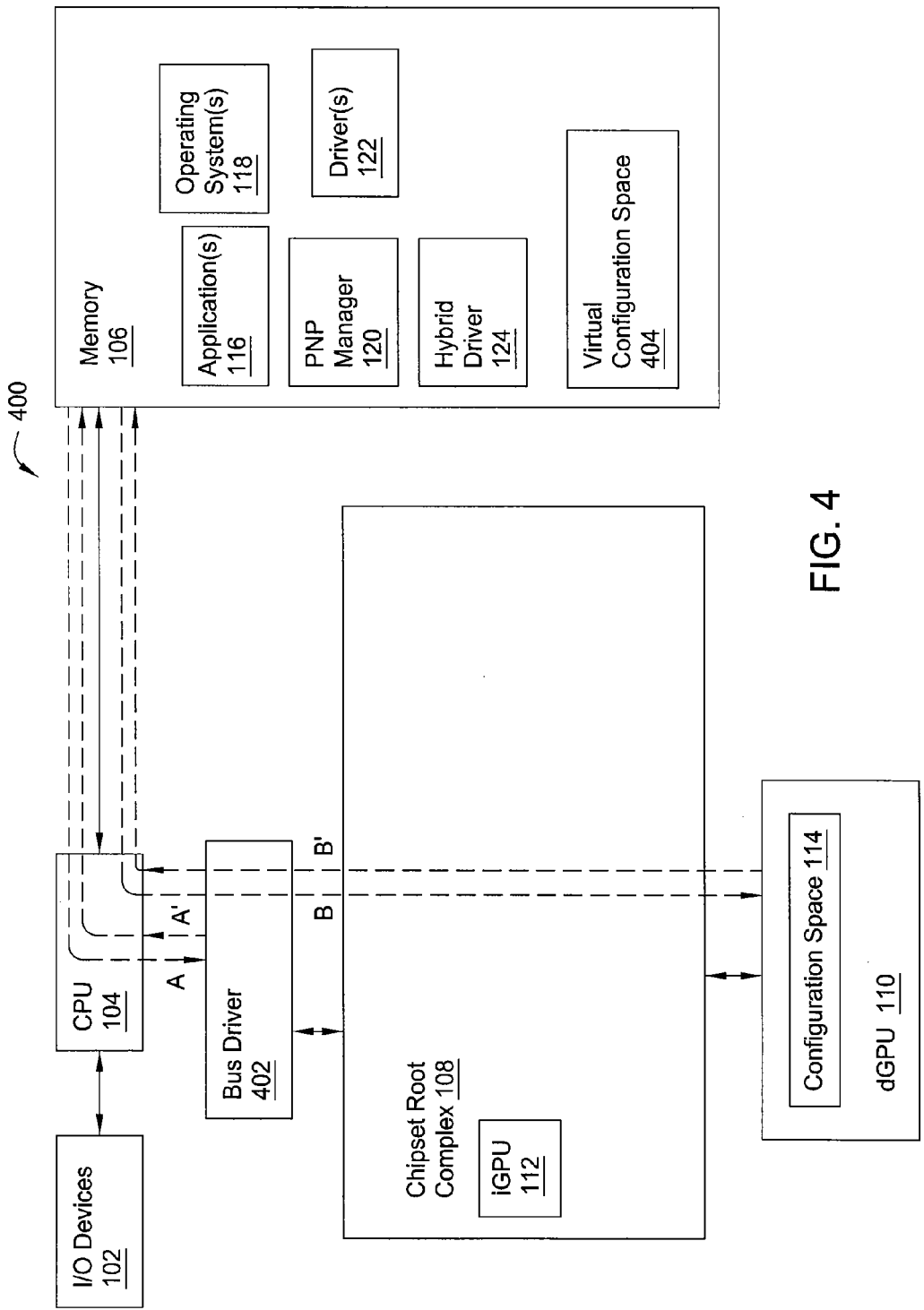
FIG. 4 is a block diagram that illustrates a hybrid graphics system configured to mask the powering up of a dGPU using a bus driver, according to one embodiment of the invention.

FIG. 4 is a block diagram that illustrates a hybrid graphics system 400 configured to mask the powering up of a dGPU 110 using a bus driver 402, according to one embodiment of the invention. Similar to the system 100, the hybrid graphics system 400 is configured to operate in the nominal mode or in the high-performance mode. Additionally, the hybrid driver 124 is configured to cause the hybrid graphics system 400 to transition between these two graphics processing modes.

As shown, the hybrid graphics system 400 includes substantially the same components included in the system 100 described above in FIG. 1. In addition, the hybrid graphics system 400 also includes a bus driver 402, and a virtual configuration space 404 within the memory 106.

The bus driver 402 is a software application that, when executed by the CPU 104 coordinates data flow between the CPU 104 and the chipset root complex 108. In addition, the bus driver 402 is configured to satisfy access requests on behalf of the dGPU 110 when the dGPU 110 is powered down (e.g., when the hybrid graphics system 400 operates in the nominal performance mode).

When the hybrid driver 124 causes the hybrid graphics system 400 to transition from the high-performance mode to the nominal mode, the bus driver 402 copies the configuration space 114 from the dGPU 110 to the virtual configuration space 404. In doing so, the bus driver 402 copies the value of each configuration register included in the configuration space 114 to a corresponding virtual configuration register included in the virtual configuration space 404.

The bus driver 402 then satisfies access requests transmitted from the PNP manager 120 that target the dGPU 110 by updating the virtual configuration space 404 based on the access requests. When executed by the CPU 104, the PNP manager 120 transmits an access request that targets the dGPU 110 along path A. The bus driver 402 receives the access request and then determines whether the access request targets the dGPU 110. When the access request does not target the dGPU 110, the bus driver 402 routes the access request to the device targeted by the access request.

When the bus driver 402 determines that the access request targets the dGPU 110, the bus driver 402 satisfies the access request by updating the virtual configuration space 404. The bus driver 402 satisfies the access request by updating the virtual configuration space 404 based on the access request. More specifically, the bus driver 402 modifies values stored in specific virtual configuration registers indicated in the access request. The bus driver 402 updates these specific virtual configuration registers to reflect values indicated in the access request.

The bus driver 402 then transmits a confirmation to the PNP manager 120 along path A' indicating that the access request has been satisfied. The bus driver 402 is configured to repeatedly satisfy access requests transmitted from the PNP manager 120 that target the dGPU 110 while the hybrid graphics system 400 operates in the nominal mode. In one embodiment, the bus driver 402 also satisfies access requests transmitted by the applications 116 and/or the O/S 118 that target the dGPU 110.

As previously described, the hybrid driver 124 may cause the hybrid graphics system 400 to transition from the nominal mode into the high-performance mode in order to perform high-performance graphics processing operations with the dGPU 110. When the hybrid driver 124 causes the hybrid graphics system 400 to transition from nominal mode to high-performance mode, the hybrid driver 124 causes the dGPU 110 to power up, migrates any threads executing on the iGPU 112 to the dGPU 110, and reroutes graphics processing operations to the dGPU 110, as also previously described. The bus driver 402 then copies the virtual configuration space 404 to the configuration space 114. In doing so, the bus driver 402 copies the value of each virtual register included in the virtual configuration space 404 to a corresponding configuration register included in the configuration space 114.

The dGPU 110 may then receive and satisfy access requests transmitted by the PNP manager 120 or, in some embodiments, by the applications 116 and/or the O/S 118. When the hybrid graphics system 400 operates in the high-performance mode, the PNP manager 120 transmits access requests to the dGPU 110 along path B. The dGPU 110 then satisfies these access requests, as described, and transmits a confirmation to the PNP manager 120 along path B'.

As with the access request management application 216 described in FIG. 2, and the SMM application 302 described in FIG. 3, the bus driver 402 allows the PNP manager 120 to continue to transmit access requests that target the dGPU 110 when the dGPU 110 is powered down (e.g., when the hybrid graphics system 400 operates in the nominal mode). The dGPU 110 therefore remains enumerated to the PNP manager 120 when the dGPU 110 is powered down. Further, the driver 122 associated with the dGPU 110 remains loaded on the dGPU 110. When the hybrid driver 124 causes the hybrid graphics system 400 to transition from the nominal mode to the high-performance mode, the dGPU 110 is not re-enumerated to the PNP manager 120, and the driver is not reloaded into the dGPU 110 or reinitialized. Thus, the dGPU 110 does not need to be re-added to the hybrid graphics system 400. Accordingly, by implementing the bus driver 402, the transition from the nominal mode to the high-performance mode is expedited and therefore masked from a user of the hybrid graphics system 400.

In contrast to prior art approaches that require the steps of re-enumerating the dGPU to the PNP manager, reloading and reinitializing the driver associated with the dGPU, and re-adding the dGPU to the hybrid graphics system when powering up the dGPU, the techniques described herein avoid such time-consuming steps.

Figure 5:
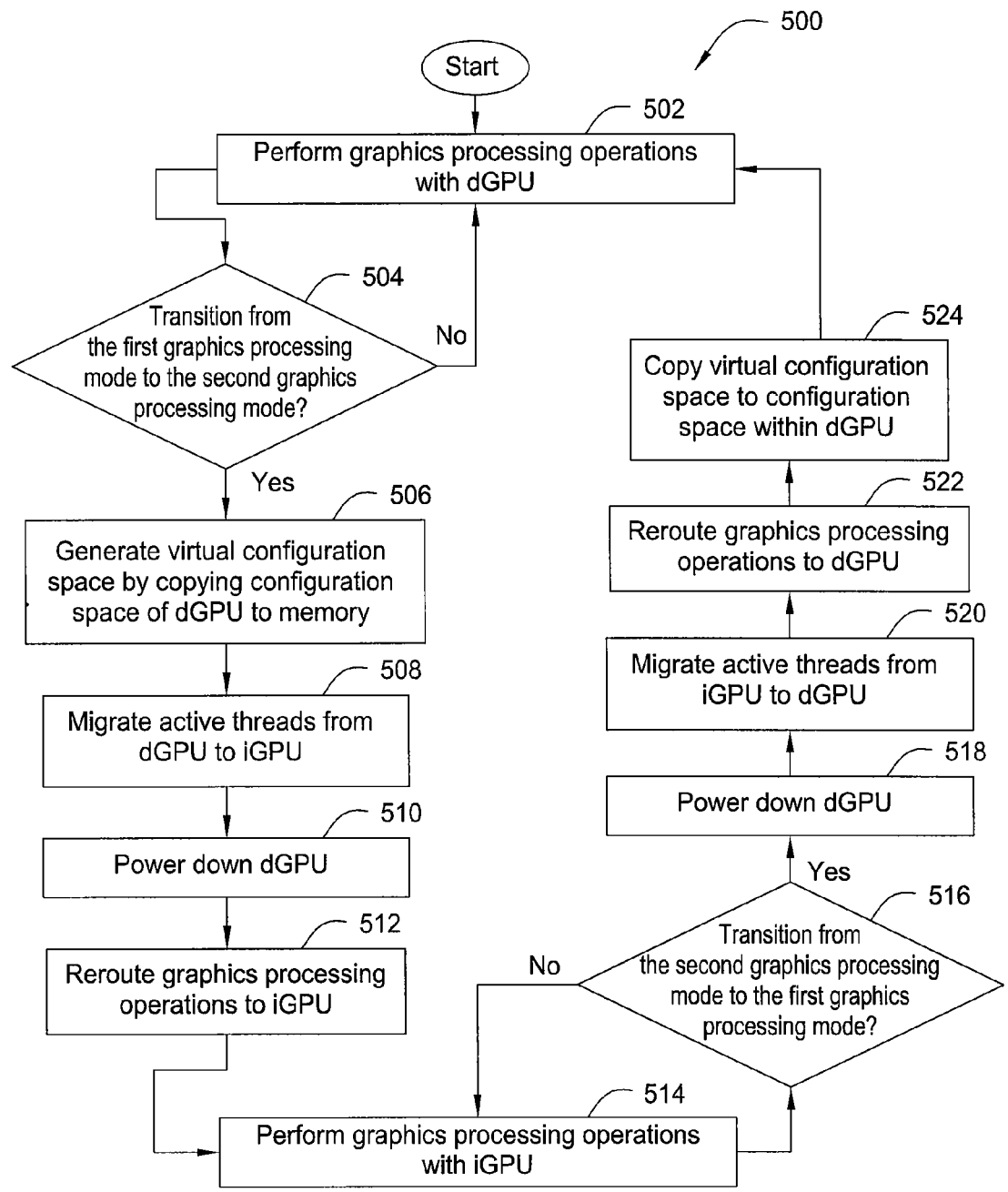
FIG. 5 is a flowchart of method steps for transitioning between graphics processing modes in a hybrid graphics system, according to one embodiment of the invention.

FIG. 5 is a flowchart of method steps for routing a configuration space access request in a hybrid graphics system, according to one embodiment of the invention. Persons skilled in the art will understand that, although the method 500 is described in conjunction with the systems of FIGS. 1-4, any system configured to perform the method steps, in any order, is within the scope of the present invention.

As shown, the method 500 begins at step 502, where the hybrid graphics system performs graphics processing operations with the dGPU 110. The hybrid graphics system performs graphics processing operations with the dGPU 110 when operating in the high-performance mode. The hybrid graphics system 100 operates in the high-performance mode when high-performance graphics processing operations are required. For example, when the hybrid graphics system executes a complex physical simulation, the hybrid graphics system operates in the high-performance mode to render the physical simulation.

At step 504, hybrid driver 124 determines whether to cause the hybrid graphics system to transition from a first graphics processing mode to a second graphics processing mode. In one embodiment, the first graphics processing mode represents the high-performance mode and the second graphics processing mode represents the nominal mode. The hybrid driver 124 determines whether to transition the hybrid graphics system from the first graphics processing mode to the second graphics processing mode based on the complexity of graphics processing operations required to be performed by the hybrid graphics system, based on an amount of battery power remaining in a battery associated with the hybrid graphics system, or based on user input, among other things.

If the hybrid driver 124 determines that the hybrid graphics system should not be transitioned from the first graphics processing mode to the second graphics processing mode, then the method 500 returns to step 502, as described above. If the hybrid driver 124 determines that the hybrid graphics system should be transitioned from the first graphics processing mode to the second graphics processing mode, then the method 500 proceeds to step 506.

At step 506, in one embodiment, the access request management application 216 generates the virtual configuration space 218. In this embodiment, the access request management application 216 generates the virtual configuration space 218 by copying the configuration space 114 associated with the dGPU 110 to the memory 214. In doing so, the access request management application 216 copies the value of each configuration register included in the configuration space 114 to a corresponding virtual configuration register included in the virtual configuration space 218. In another embodiment, the CPU 104 may execute the SMM application 302 described in FIG. 3 to perform step 506. In yet another embodiment, the bus driver 402 described in FIG. 4 may perform step 506.

At step 508, the hybrid driver 124 migrates all active threads currently executing on the dGPU 110 to the iGPU 112. At step 510, the hybrid driver 124 causes the dGPU 110 to power down. At step 512, the hybrid driver 124 reroutes graphics processing operations being performed by the hybrid graphics system to the iGPU 112.

At step 514, the hybrid graphics system performs graphics processing operations with the iGPU 112. The hybrid graphics system performs graphics processing operations with the iGPU 112 when operating in the nominal mode. The hybrid graphics system operates in the nominal mode when high-performance graphics processing operations are not required. For example, when the hybrid graphics system generates images for a simple web page, the hybrid graphics system operates in the nominal mode to render the web page.

In one embodiment, as described in greater detail below in FIG. 6, when the hybrid graphics system operates in the nominal mode, and the PNP manager 120 transmits one or more access requests that target the dGPU 110, the SMU processor 212 executes the access request management application 216 in order to receive and to satisfy these access requests. The access request management application 216 updates the virtual configuration space 218 to satisfy the access requests, then transmits a confirmation to the PNP manager 120 indicating that the access request has been satisfied. In another embodiment, the SMM application 302 described in FIG. 3 may receive and satisfy the access requests and then transmit the confirmation to the PNP manager 120. In yet another embodiment, the bus driver 402 described in FIG. 4 may receive and satisfy the access requests and transmit the confirmation to the PNP manager 120.

At step 516, hybrid driver 124 determines whether to cause the hybrid graphics system to transition from the second graphics processing mode to the first graphics processing mode. The hybrid driver 124 determines whether to transition the hybrid graphics system from the second graphics processing mode to the first graphics processing mode based on the graphics processing operations being performed by the hybrid graphics system 100 or based on the complexity of graphics processing operations required to be performed by the hybrid graphics system, based on an amount of battery power remaining in a battery associated with the hybrid graphics system, or based on user input, among other things.

If the hybrid driver 124 determines that the hybrid graphics system should not be transitioned from the second graphics processing mode to the first graphics processing mode, then the method 500 returns to step 514, as described above. If the hybrid driver 124 determines that the hybrid graphics system should be transitioned from the second graphics processing mode to the first graphics processing mode, then the method 500 proceeds to step 518.

At step 518, the hybrid driver 124 causes the dGPU 110 to power up. In contrast to prior art approaches that require the steps of re-enumerating the dGPU to the PNP manager, reloading and reinitializing the driver associated with the dGPU, and re-adding the dGPU to the hybrid graphics system when powering up the dGPU, the techniques described herein avoid such time-consuming steps.

At step 520, the hybrid driver 124 migrates all active threads currently executing on the iGPU 112 to the dGPU 110. At step 522, the hybrid driver 124 reroutes graphics processing operations being performed by the hybrid graphics system 100 to the dGPU 110.

At step 524, in one embodiment, the access request management application 216 copies the virtual configuration space 218 to the configuration space 114. In this embodiment, the access request management application 216 copies the value of each virtual configuration register included in the virtual configuration space 218 to a corresponding configuration register included in the configuration space 114. In another embodiment, the CPU 104 may execute the SMM application 302 described in FIG. 3 to perform step 524. In another embodiment, the bus driver 402 described in FIG. 4 may perform step 524. The method 500 then returns to step 502, described above.

Figure 6:
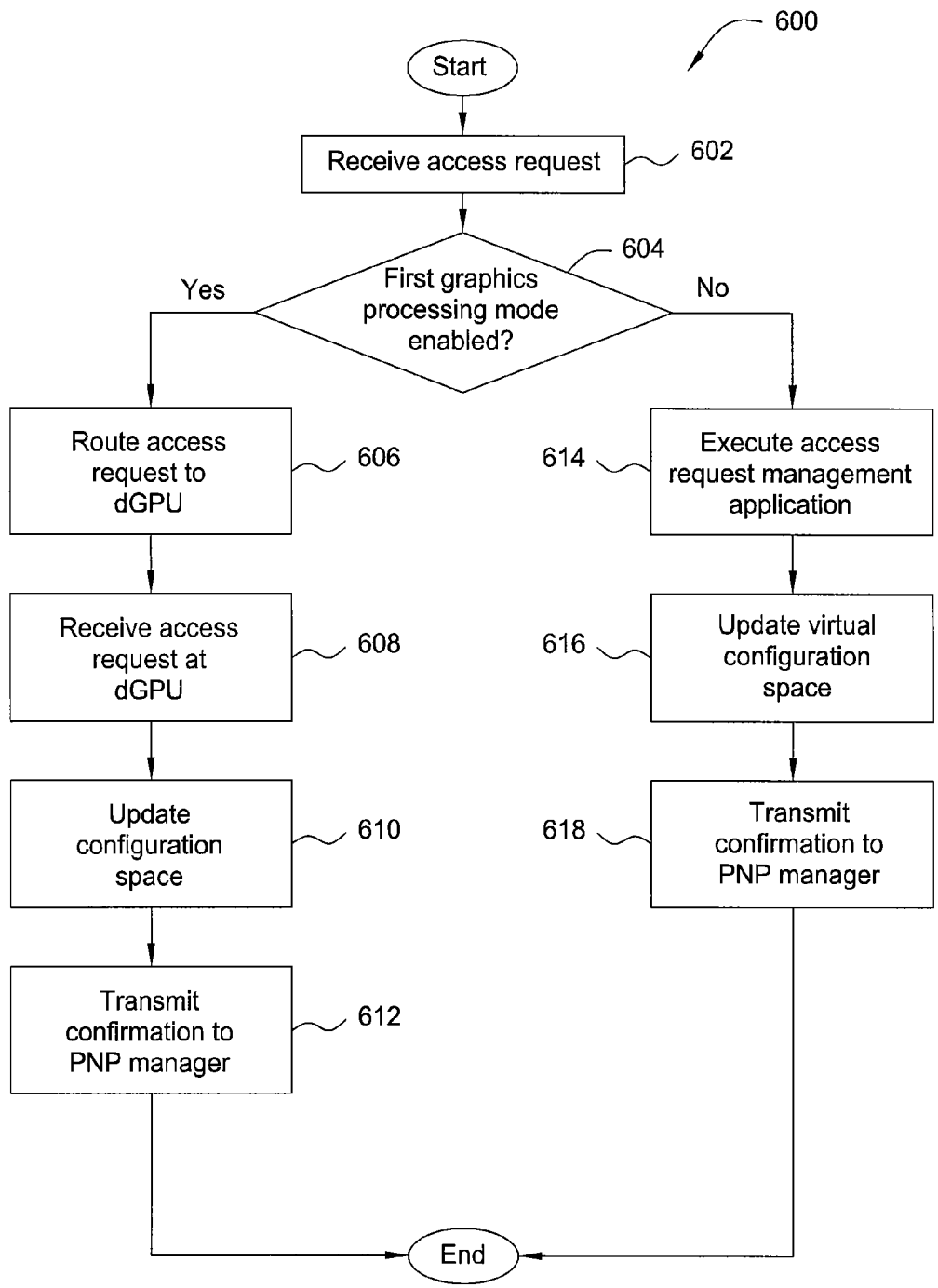
FIG. 6 is a flowchart of method steps for routing an access request in a hybrid graphics system, according to one embodiment of the invention.

FIG. 6 is a flowchart of method steps for transitioning between operating modes in a hybrid graphics system, according to one embodiment of the invention. Persons skilled in the art will understand that, although the method 600 is described in conjunction with the systems of FIGS. 1-4, any system configured to perform the method steps, in any order, is within the scope of the present invention.

As shown, the method 600 begins at step 602 where, in one embodiment, the SMU 210 receives an access request from the PNP manager 120. The access request could be, for example, an MMIO access request or a configuration space access request, among others. In another embodiment, the CPU 104 may perform step 602, as described in FIG. 3. In yet another embodiment, the bus driver 402 may perform step 602, as described in FIG. 4.

At step 604, in one embodiment, the SMU 212 determines whether the first graphics processing mode is enabled. The first graphics processing mode could be, for example, the high-performance graphics processing mode. If the SMU 212 determines that the first graphics processing mode is enabled, then the method 600 proceeds to step 606. In another embodiment, the CPU 212 may perform step 604, as described in FIG. 3. In yet another embodiment, the bus driver 402 may perform step 604, as described in FIG. 4.

At step 606, in one embodiment, the SMU 210 routes the access request to the dGPU 110. In another embodiment, the CPU 104 may perform step 606, as described in FIG. 3. In yet another embodiment, the bus driver 402 may perform step 606, as described in FIG. 4.

At step 608, the dGPU 110 receives the access request. At step 610, the dGPU 110 updates the configuration space 114 in order to satisfy the access request. In doing so, the dGPU 110 modifies the values stored in specific configuration registers included in the configuration space 114 that are indicated in the access request. The dGPU 110 updates these specific configuration registers to reflect values indicated in the access request. At step 612, the dGPU 110 transmits a confirmation to the PNP manager 120 indicating that the access request has been satisfied.

Referring back now to step 604, if the SMU 210 determines that the first graphics mode is not enabled, then the method 600 proceeds to step 614. At step 614, in one embodiment, the SMU processor 212 executes the access request management application 216. The access request management application 216 resides within the SMU memory 214. In another embodiment, at step 614, the CPU 104 may execute the SMM application 302 to process the access request, as described in FIG. 3.

At step 616, in one embodiment, the access request management application 216 updates the virtual configuration space 218. In doing so, the access request management application 216 updates the value of each virtual configuration register included in the virtual configuration space 218 based on the access request.

At step 618, in one embodiment, the access request management application 216 transmits a confirmation to the PNP manager 120 indicating that the access request has been satisfied. The method 600 then terminates.

In another embodiment, the SMM application 302 described in FIG. 3 may perform steps 618, 620, and 622. In yet another embodiment, the bus driver 402 described in FIG. 4 may perform steps 618, 620, and 622.

When the hybrid graphics system implements the method 600, the PNP manager 120 may continue to transmit access requests that target the dGPU 110 when the dGPU is powered down (e.g., when the hybrid graphics system 100 operates in the nominal mode). The dGPU 110 remains enumerated to the PNP manager 120 when the dGPU 110 is powered down. Further, the driver 122 associated with the dGPU 110 remains loaded on the dGPU 110 when the dGPU 110 is powered down. When the hybrid driver 124 causes the hybrid graphics system 100 to transition from the nominal mode to the high-performance mode, the dGPU 110 is not re-enumerated to the PNP manager 120, and the driver does is not reloaded into the dGPU 110 or reinitialized. Accordingly, when a hybrid graphics system implements the method 600, the transition from the nominal mode to the high-performance mode is expedited and, therefore, masked from a user of the hybrid graphics system 100.

In sum, a hybrid graphics system is configured to operate in a high-performance mode when high-performance graphics processing operations are required and in a nominal mode when high-performance graphics processing operations are not required. When the hybrid graphics system operates in the high-performance mode, a discrete graphics processing unit (dGPU) performs graphics processing operations. When the hybrid graphics system operates in the nominal mode, an integrated graphics processing unit (iGPU) performs graphics processing operations, and the dGPU is powered down. A hybrid driver is configured to cause the hybrid graphics system to transition from the high-performance mode to the nominal mode, and vice-versa.

When the hybrid graphics system operates in the high-performance mode, a plug-and-play (PNP) manager included in the hybrid graphics system is configured to enumerate the dGPU and to transmit access requests that target the dGPU. The access requests may include memory-mapped input/output (MMIO) requests or configuration space access requests. When the PNP manager transmits an access request that targets the dGPU, the dGPU updates a configuration space included in the dGPU in order to satisfy the access requests.

When the hybrid driver causes the hybrid graphics system to transition from the high-performance mode to the nominal mode, a system management unit processor within a system management unit executes an access request management application. The access request management application copies the configuration space included in the dGPU to a virtual configuration space included in a memory unit associated with the hybrid graphics system.

Once the hybrid graphics system is transitioned to the nominal mode, the dGPU is powered down and therefore cannot satisfy access requests received from the PNP manager. When the PNP manager transmits an access request that targets the dGPU, the access request management application receives the access request and satisfies the access request on behalf of the dGPU. The access request management application updates the virtual configuration space based on the access request, and then transmits a confirmation to the PNP manager indicating that the access request has been satisfied. Since the access request management application satisfies access requests on behalf of the dGPU when the dGPU is powered down, the dGPU remains enumerated to the PNP manager. In addition, the driver associated with the dGPU remains loaded in the dGPU.

When the hybrid driver causes the hybrid graphics system to transition from the nominal mode to the high-performance mode, the access request management application copies the virtual configuration space to the configuration space within the dGPU. When the PNP manager transmits access requests that target the dGPU, the dGPU satisfies these access requests by updating the configuration space.

Advantageously, the dGPU does not need to be re-enumerated to the PNP manager when the dGPU is powered on, thereby expediting the transition of the hybrid graphics system from the nominal mode to the high-performance mode. Additionally, the driver associated with the dGPU does not need to be reloaded into the dGPU or reinitialized when the dGPU is powered on, further expediting this transition. Further, since the hybrid graphics system is capable of transitioning quickly from the nominal mode to the high-performance mode, the amount of time that the hybrid graphics system causes a blank screen to be displayed to a user is minimized.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

What is claimed is:

1. A computer-implemented method for masking transitions between graphics processing modes in a computer system that includes multiple graphics processor units (GPUs), the method comprising:
   determining that a hybrid driver has initiated a transition for the computer system from operating in a first graphics processing mode to operating in a second graphics processing mode;
   creating a virtual configuration space within the computer system by copying a configuration space included within a first GPU to a memory unit included within the computer system;
   receiving, from a software application, an access request targeting the first GPU;
   satisfying the access request by updating the virtual configuration space based on the access request; and
   copying the updated virtual configuration space back to the configuration space included within the first GPU when transitioning from the second graphics processing mode to the first graphics processing mode.

2. The method of claim 1,
   further comprising determining that the hybrid driver has initiated a transition for the computer system from operating in the second graphics processing mode to operating in the first graphics processing mode; and then
   copying the updated virtual configuration space within the computer system to the configuration space included within the first GPU.

3. The method of claim 1, wherein the first GPU is powered on and capable of performing graphics processing operations when the computer system operates in the first graphics processing mode, and the first GPU is powered down when the computer system operates in the second graphics processing mode.

4. The method of claim 3, wherein the computer system includes a plug-and-play (PNP) manager which enumerates and configures devices and provides system resources to the first GPU, and wherein the first GPU remains enumerated to the PNP manager while the computer system is operating in the second graphics processing mode.

5. The method of claim 3, wherein a driver associated with the first GPU remains loaded in the first GPU when the computer system operates in the second graphics processing mode as the operating system continues to perceive the first GPU as present, and therefore has no need to unload the driver associated with the first GPU.

6. The method of claim 1, wherein the configuration space included in the first GPU includes at least one configuration register that corresponds to a virtual configuration register associated with the virtual configuration space, and the step of creating the virtual configuration space comprises copying a value stored at the at least one configuration register to the corresponding virtual configuration register.

7. The method of claim 1, wherein the access request is a memory-mapped input/output (I/O) request or a configuration space access request.

8. The method of claim 1, wherein a system management unit (SMU) processor included within a SMU chipset or processor executes an access request management application to perform the steps of determining, creating, receiving, satisfying, and copying.

9. The method of claim 1, wherein a central processing unit (CPU) included within the computer system executes a system management mode (SMM) application to perform the steps of determining, creating, receiving, satisfying, and copying.

10. The method of claim 1, wherein a bus driver coupled to a system bus associated with the computer system performs the steps of determining, creating, receiving, satisfying, and copying.

11. A non-transitory computer-readable medium storing program instructions that, when executed by a processor, mask transitions between graphics processing modes in a computer system that includes a graphics processing unit (GPU), by performing the steps of:

determining that a hybrid driver has initiated a transition for the computer system from operating in a first graphics processing mode to operating in a second graphics processing mode;

creating a virtual configuration space within the computer system by copying a configuration space included within a first GPU to a memory unit included within the computer system;

receiving, from a software application, an access request targeting the first GPU;

satisfying the access request by updating the virtual configuration space based on the access request; and copying the updated virtual configuration space back to the configuration space included within the first GPU when transitioning from the second graphics processing mode to the first graphics processing mode.

12. The computer-readable medium of claim 11, further comprising determining that the hybrid driver has initiated a transition for the computer system from operating in the second graphics processing mode to operating in the first graphics processing mode; and then copying the updated virtual configuration space within the computer system to the configuration space included within the first GPU.

13. The computer-readable medium of claim 11, wherein the first GPU is powered on and capable of performing graphics processing operations when the computer system operates in the first graphics processing mode, and the first GPU is powered down when the computer system operates in the second graphics processing mode.

14. The computer-readable medium of claim 13, wherein the computer system includes a plug-and-play (PNP) manager which enumerates and configures devices and provides system resources to the first GPU, and wherein the first GPU remains enumerated to the PNP manager while the computer system is operating in the second graphics processing mode.

15. The computer-readable medium of claim 11, wherein the configuration space included in the first GPU includes at least one configuration register that corresponds to a virtual configuration register associated with the virtual configuration space, and the step of creating the virtual configuration space comprises copying a value stored at the at least one configuration register to the corresponding virtual configuration register.

16. The computer-readable medium of claim 11, wherein the access request is a memory-mapped input/output (I/O) request or a configuration space access request.

17. A computer system for masking transitions between graphics processing modes, comprising:

a processing unit;

a first graphics processing unit (GPU) that includes a configuration space; and a memory unit storing a first software application that, when executed by the processor, is configured to:

determining that a hybrid driver has initiated a transition for the computer system from operating in a first graphics processing mode to operating in a second graphics processing mode;

creating a virtual configuration space within the computer system by copying a configuration space included within a first GPU to a memory unit included within the computer system;

receiving, from a software application, an access request targeting the first GPU;

satisfying the access request by updating the virtual configuration space based on the access request; and copying the updated virtual configuration space back to the configuration space included within the first GPU when transitioning from the second graphics processing mode to the first graphics processing mode.

18. The computer system of claim 17, further comprising a system memory that stores the virtual configuration space, and wherein the processing unit comprises a system management unit (SMU) processor, and the memory unit comprises a SMU memory.

19. The computer system of claim 17, wherein the memory unit comprises a system memory, and the processing unit comprises a central processing unit (CPU), and wherein the first software application comprises a system management mode (SMM) application.

20. The computer system of claim 17, wherein the processing unit comprises a central processing unit (CPU), and the first software application comprises a bus driver.

21. The computer system of claim 17, wherein a driver associated with the first GPU remains loaded in the first GPU when the computer system operates in the second graphics processing mode.

* * * * *